United States Patent [19]

Chernick

[11] 4,143,373
[45] Mar. 6, 1979

[54] ADAPTIVE RADAR SYSTEMS AND METHODS THEREFOR

[75] Inventor: Leon Chernick, Encino, Calif.

[73] Assignee: Hughes Aircraft Company, Culver City, Calif.

[21] Appl. No.: 835,101

[22] Filed: Sep. 21, 1977

[51] Int. Cl.² .............................................. G01S 9/10
[52] U.S. Cl. .............................. 343/17.1 PF; 343/7.5; 343/9
[58] Field of Search ...................... 343/17.1 PF, 7.5, 9, 343/7.7

[56] References Cited

U.S. PATENT DOCUMENTS

| 3,258,769 | 6/1966 | Forestier | 343/17.1 PF |
| 3,858,208 | 12/1974 | Parke et al. | 343/17.1 PF |

FOREIGN PATENT DOCUMENTS 1408289 10/1975 United Kingdom ...................... 343/7.5

OTHER PUBLICATIONS

Skolnik, *Radar Handbook*, McGraw-Hill, 1970, pp. 19-13.

*Primary Examiner*—T.H. Tubbesing
*Assistant Examiner*—Lawrence Goodwin
*Attorney, Agent, or Firm*—Lawrence V. Link, Jr.; W. H. MacAllister

[57] ABSTRACT

Radar systems in which target detection and unambiguously measured range rate are derived from returns from a high pulse repetition frequency (PRF) transmitted waveform; and wherein a lower PRF waveform is adaptively selected as a function of the measured range rate so that the range of even targets, that might otherwise be obscured by clutter, is unambiguously measured. For high PRF track update for a target on which track file data has been established, predicted range is used to adaptively select a high PRF waveform which avoids eclipsing of target returns due to the receiver being non-receptive during the transmission mode.

10 Claims, 11 Drawing Figures

ADAPTIVE RADAR SYSTEMS AND METHODS THEREFOR

BACKGROUND OF THE INVENTION

This invention relates generally to radar systems and methods therefor; and more particularly to pulse doppler radar systems and methods therefor which provide unambiguous target range (R) and range rate (Ṙ).

The design and selection of the optimum transmission waveform for a radar system that detects and tracks targets in the presence of land and/or sea clutter is a generic problem which has faced radar designers for many years. Accuracy requirements for target range and range rate measurements normally dictate that the transmitted waveform be a periodic pulse train or a pulse of encoded signals. However, choosing such a pulse train presents problems in selecting the PRF and/or the RF (radio frequency) bandwidth so that the desired accuracy and clutter resolution are obtained but neither the range rate nor the range measurement is ambiguous. For example, if the PRF is selected high enough so that the range rate measurement is unambiguous then the unambiguous range interval will be too small for many applications. Alternately, if a low enough PRF is selected to provide an acceptable unambiguous range interval then the unambiguous range rate capability is too small for many applications. Also due to the relatively small frequency interval between clutter spectral lines in the low PRF transmission mode, clutter signals are likely to be in the same frequency range as, and thereby obscure target returns; i.e. the target signals are likely to be "doppler eclipsed" by the clutter signals. Further, in the high PRF mode there is a relatively short "listening" period between transmission pulses and target returns can be "range eclipsed" due to the receiver being "non-receptive" during the transmission mode.

One type of current radar system employs transmission waveforms which measure one of the parameters (range or range rate) precisely and the second parameter rather inaccurately; however, both parameters are determined unambiguously. The AWG-9 radar system manufactured by Hughes Aircraft Company is of the just described type. Another type of current radar system, i.e. the MK-23, Target Acquisition System (TAS) designed by Hughes Aircraft Company, measures both parameters precisely but one is ambiguous. The APG-63 radar system, also manufactured by Huges Aircraft Company, precisely but ambiguously measured both targets' characteristics (range and velocity) and ambiguities are then resolved by methodically shifting waveforms during the dwell period and/or using frame-to-frame computer association and correlation routines.

SUMMARY OF THE INVENTION

It is therefore a primary object of the subject invention to provide a radar system which produces accurate and unambiguous measurements of both the range and range rate of targets.

A more particular object of the invention is to provide a radar system which in a cluttered environment and during a single dwell period, 20 milliseconds, for example, produces accurate and unambiguous measurements of a target's range and range rate.

Yet another object of the subject invention is to provide an improved radar system which adaptively selects a low pulse repetition waveform as a function of target range rate measured during a high pulse repetition mode of operation; whereby both range and range rate are accurately and unambiguously measured during a very short time period.

A further object of the subject invention is to provide an improved radar system which in its target tracking mode of operation adaptively selects near optimum high and low pulse repetition frequency transmission waveforms for accurately and unambiguously measuring both the target's range rate and range.

The subject invention comprises a radar system adapted for detecting moving targets in a cluttered environment and for unambiguously and accurately measuring the target's range and range rate.

In accordance with one preferred embodiment thereof, the detection of the target and its unambiguous range rate are derived from return energy resulting from a high (250,000 pps, for example) pulse repetition frequency (PRF) transmitted waveform. The measured range rate value is used to compute a lower (2,000 to 5,000 pps, for example) PRF waveform which avoids doppler eclipsing of targets and unambiguously measures the target's range, i.e. the selected lower PRF is adapted to the range rate (Ṙ) of the target measured during the high PRF mode such that the frequency (doppler shifted) of the target return is not in a frequency range obscured by clutter. The concepts of the invention are also applicable to variations such as using a high PRF waveform to determine Ṙ which is then utilized to adapt a medium PRF waveform.

For a previously detected target the range, predicted as a function of range and range rate values measured during a previous antenna scan cycle, is used to adaptively select a high PRF waveform which avoids range eclipsing of the target return signal due to the receiver being "non-receptive" during transmission periods. For the search mode of operation, a plurality of different high PRF waveforms are transmitted at the same antenna scan position whereby the possibility of range eclipsing of the return signal is minimized.

The subject invention provides accurate and unambiguous measurement of both range and range rate in a relatively short time period, for example during a single dwell time (the time the target is within the beam of the antenna) of a scanning radar antenna. These advantages are provided by means for adaptively seiecting the optimum transmission waveforms as a function of real time measurements of target characteristics. For example, the radar could perform a high PRF doppler search using a plurality of different preselected high PRF values and then, during the same dwell time (time on target) switch to an adaptively selected low PRF waveform for precise range tracking and clutter resolution. On subsequent dwell times the high PRF is also adaptively selected so as to avoid range eclipsing.

Systems in accordance with the subject invention provide accurate and unambiguous measurement of both target range and range rate with shorter dwell times then would be possible if, as with the hereinabove referred APG-63 radar system, a fixed sequence of ambiguous waveforms are employed and correlation routines implemented to resolve the ambiguities.

The subject invention allows for the nearly simultaneous measurement of target range and range rate while providing range accuracy of low PRF waveforms and doppler (range rate) accuracy of high PRF waveforms. Nearly simultaneous and accurate range and range rate data is advantageous because, for example, it allows the use of enhancement techniques for the resolution of multiple targets.

BRIEF DESCRIPTION OF THE DRAWINGS

The novel features of this invention, as well as the invention itself, will be better understood from the accompanying description taken in connection with the accompanying drawings in which like reference characters refer to like parts and in which.

DETAILED DESCRIPTION OF THE PREFERRED EMBODIMENT

Figure 1:
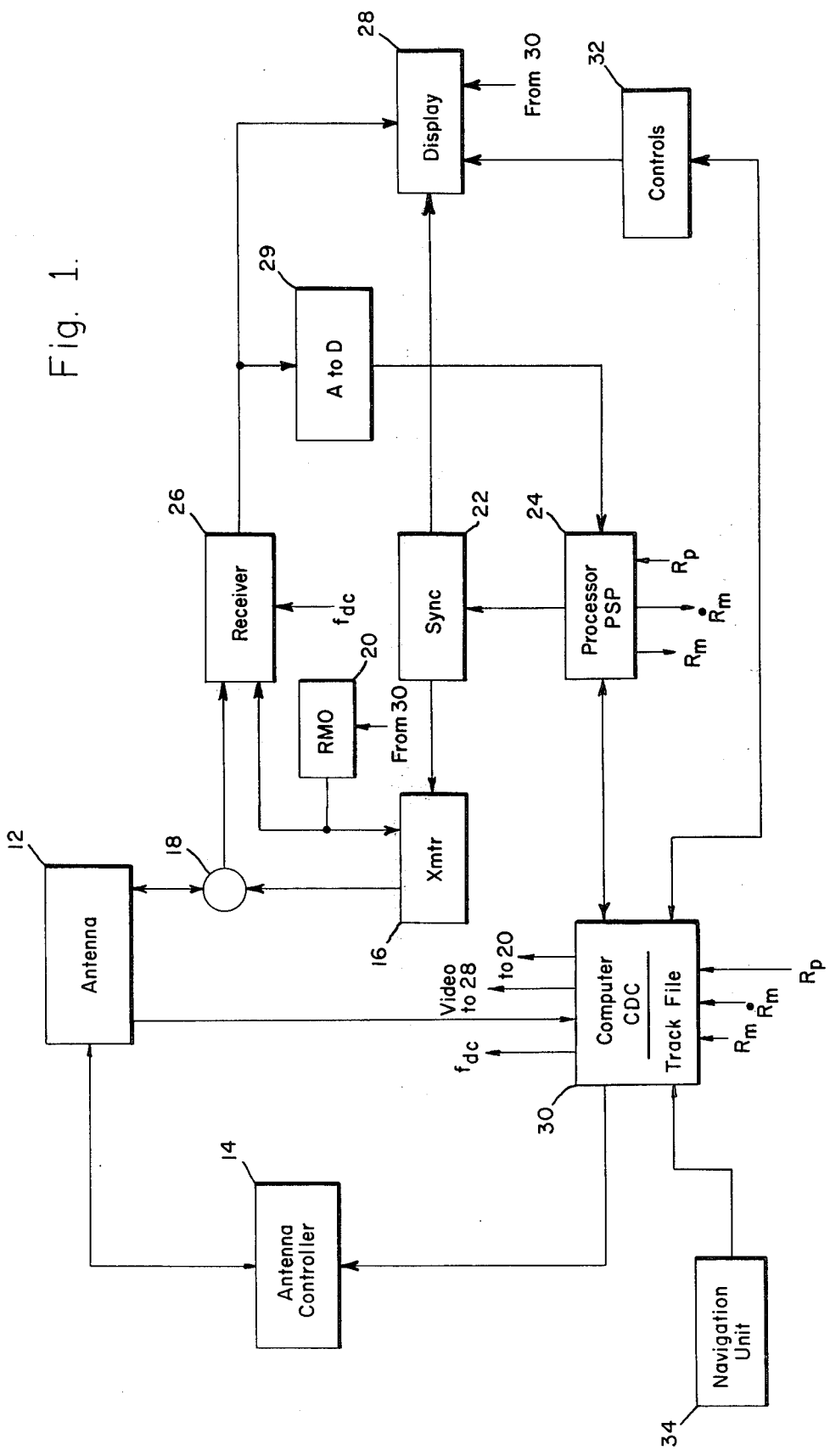
FIG. 1 is a block diagram of one preferred embodiment of an adaptive radar system in accordance with the subject invention.

Reference is first directed primarily to FIG. 1 which shows a radar system that incorporates one preferred embodiment of the subject invention. Except for the means and method relating to the selection and transmission of adaptive waveforms and the processing of received energy to make said selection, the subassemblies shown in FIG. 1 may be suitable conventional units. An antenna 12 in FIG. 1 responds to signals from an antenna controller 14 so as to provide the system with a scanning beam which traces a 360° spiral or a raster scan pattern, for example. Power from a transmitter (XMTR) 16 is applied to the antenna 12 through a duplexer 18.

The frequency of the transmitted signals is determined by a radar master oscillator (RMO) 20. The pulse repetition frequency (PRF) and the pulse width of the transmitted signals are established by a synchronizer (SYNCH) 22 in response to control signals from a programmable signal processor (PSP) 24. The program for processor 24 will be discussed in detail relative to FIGS. 5 through 7. In the high PRF (HPRF) mode of operation, for example, pulse lengths in the order of one to two microseconds are transmitted at repetition rates on the order of 250,000 pulses per second. For the low PRF mode (LPRF) of operation a 32 microsecond pulse at a pulse repetition rate of less than 10,000 pulses per second, for example, is employed with the pulses being frequency encoded (chirped) for pulse compression on reception. As will be described subsequently, medium PRF (about 10,000 to 50,000 pulses per second) capability may be desirable for added system flexibility, but in order to maintain clarity of the present description the high and low PRF modes will be given primary consideration.

The received RF signals from the antenna 12 are applied through the duplexer 18 and are processed by a doppler receiver 26, which may be a conventional type, for example. In the high PRF mode analog clutter rejection and analog sub-band filters can be employed in accordance with conventional techniques, or any suitable digital arrangements may be utilized.

The radar master oscillator (RMO) 20 and synchronizer 22 together function to generate coherent chirped waveforms at a number of different low pulse repetition rates; for example, 10 to 20 different PRFs within the range of 2,00 to 5,000 pulses per second. Rapid switching capability (e.g. a millisecond) from high to low (or medium) PRF and back to high PRF would be desirable for the radar master oscillator, synchronizer and transmitter combination. The intermediate frequency (IF) digitzed data from analog to digital converter 29, which may be in the "in pulse-quadrature" format, is utilized within programmable single processors 24 so as to automatically detect moving targets in accordance with well known target detection techniques. In the high PRF mode the range rate of each target is determined as a function of the doppler frequency of the received energy in accordance with well known filtering techniques. In the low (or medium) PRF processing mode the target's range is determined for each detected target and this data is supplied to a central data computer (CDC) 30 which computes the predicted range for the target the next time the antenna 12 scans the predicted target location.

Data concerning detected targets, for example, the relative bearing, range (R) and range rate (Ṙ) is applied from CDC 30 to a display 28 for visual readout. Also analog video from a receiver 26 is applied to the display 28.

A navigational unit 34 supplies data definitive of the velocity vector and heading of the vehicle which carries the radar system to central data computer 30. Computer 30 computes the doppler frequency shift ($f_{dc}$) for return signals from stationary objects, i.e. to computes the doppler shift impressed upon signals due to the motion of the vehicle. The signal ($f_{dc}$) is applied to the receiver 26 wherein it is used to control a voltage controlled oscillator unit (not shown) whose output is mixed with the received signals so as to compensate for the vehicle motion in accordance with well known motion compensation techniques. As the result of this motion compensation processing target signals from the receiver are at a frequency which is doppler shifted due to the target's motion; but doppler shifts due to motion of the radar system have been removed from both target and clutter signals.

The processing algorithms for programmable signal processor 24 are conventional except for those relating to the selection of the adaptive transmission waveforms. For example, the output data from analog to digital converter 29 is "weighted," fast fourier transformed (filtered) and using standard detection techniques, threshold crossing are detected. In the high PRF mode, digital data indicative of the range rate ($\dot{R}$) of detected targets is applied from PSP 24 to the central data computer 30. In the low PRF mode, data indicative of the target's range and range rate is sent to the central data computer 30; and the antenna 12 provides the measured spatial position of the target ($AZ_m$ and $E1_m$ signals) to central data computer 30. In response to the measured range rate and spatial position data for a given target, the computer 30 predicts the target's range ($R_p$), range rate ($\dot{R}_p$) and spatial position ($AZ_p$ and $E1_p$) during the next period that the antenna scans past a given target.

In the low PRF mode, target detections may be inhibited based on an open loop estimate of their clutter characteristic due to their measured doppler (range rage). For example, a ground moving target (gmt) approaching the radar has a doppler shift at X band frequencies of approximately (20 $\dot{R}_{gmt}$) and targets moving at less than say 40 feet/second (ground moving targets), for example, may be eliminated from the low PRF detection process by excluding all returns with a doppler frequency less than 800 hz.

Figure 5:
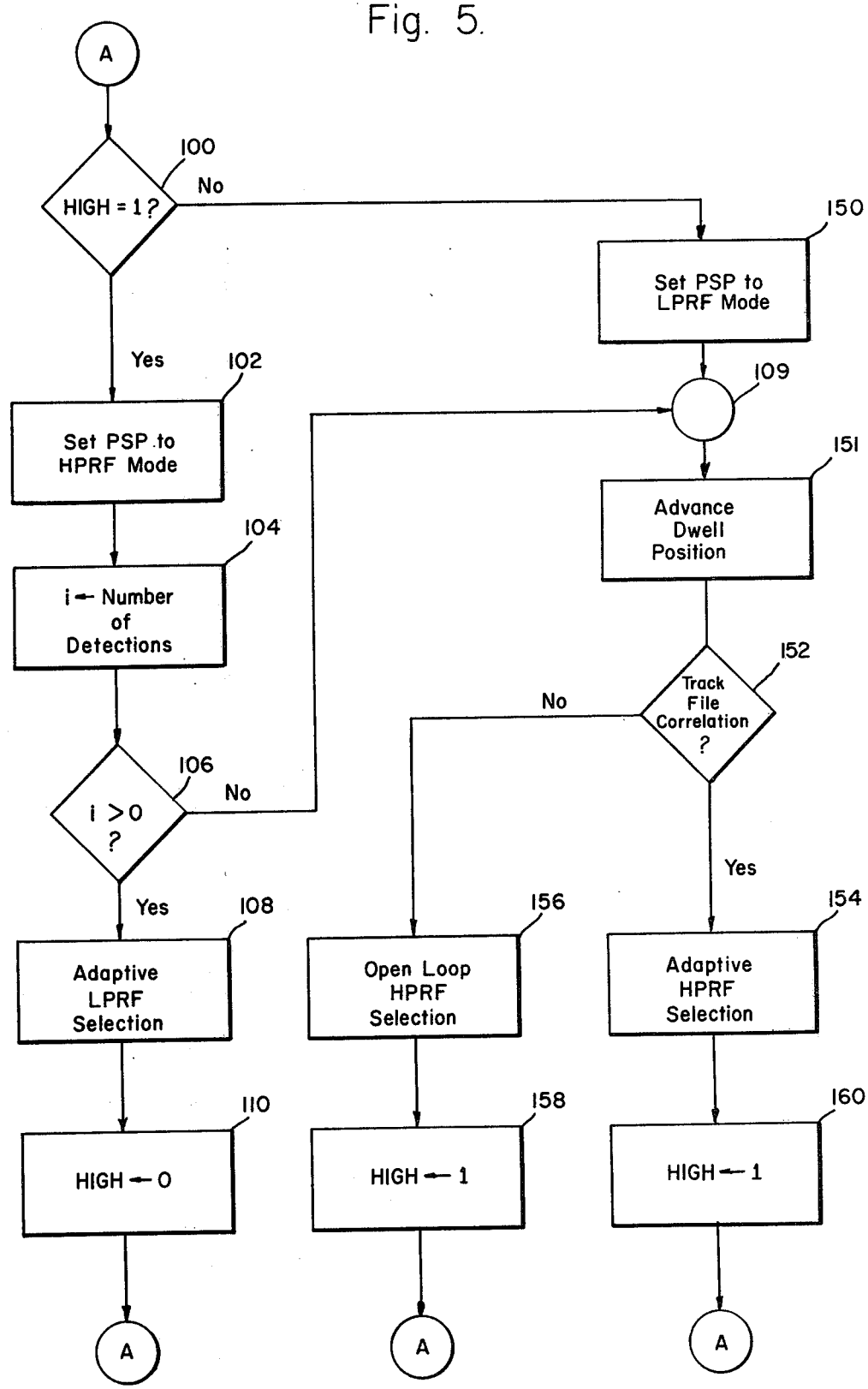
FIG. 5 is a flow chart of a computer program for determining adaptive transmission waveforms in accordance with the subject invention.
Figure 6:
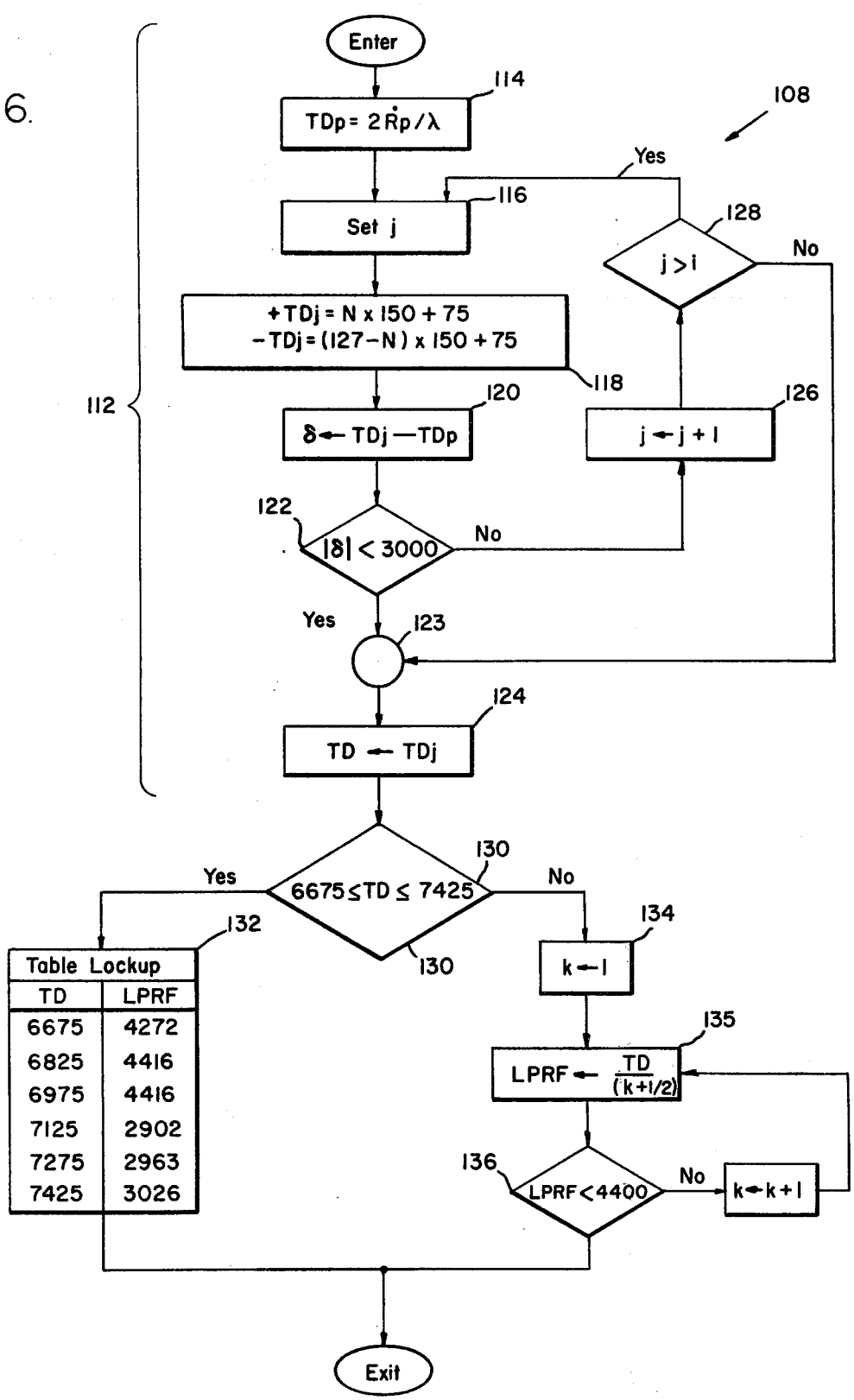
FIG. 6 depicts a subroutine for step 108 of FIG. 5 which selects the adaptive low PRF.
Figure 7:
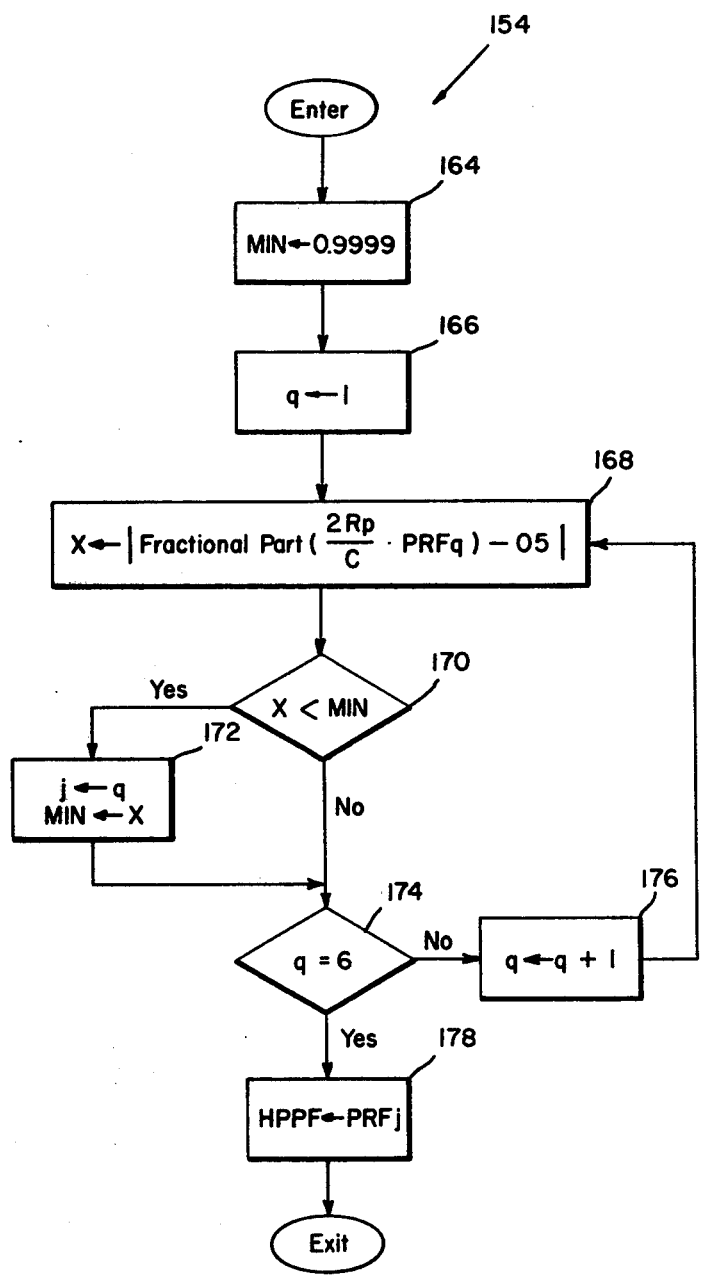
FIG. 7 is a subroutine for step 154 of FIG. 5 which selects the adaptive low PRF.

Prior to considering the flow charts of FIGS. 5 through 7, which disclose the implementation details of the adaptive waveform selection implemented by the programmable signal processor 24, a brief review of the operation thereof will be provided by way of background.

Figure 2:
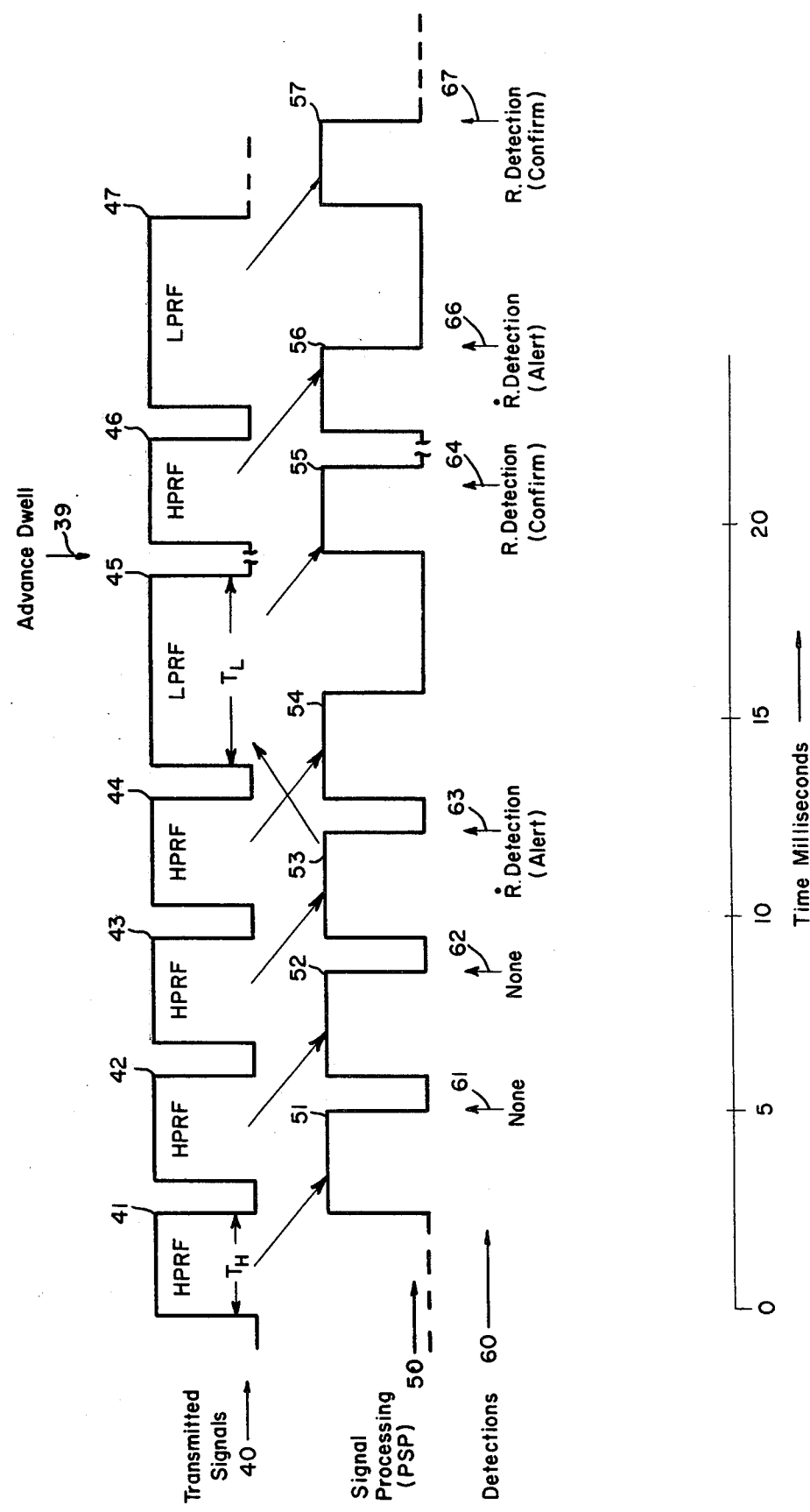
FIG. 2 depicts timing waveforms which are useful for explaining the operation of the adaptive radar system of FIG. 1.

Referring to FIG. 2, intervals 41 through 43 of waveforms 40 comprise the transmission of trains of high PRF pulses each of which have different pulse repetition frequencies. For example, as shown from left to right in FIG. 2 the high PRF waveforms are designated as group 2, 3 and 1. Different pulse repetition frequencies are used during the high PRF search mode so as to avoid target eclipsing due to the system inability to receive target returns during transmission periods. For example, if pulses 1.6 microseconds in duration are transmitted at 250,000 pulses per second rate (a 4 microsecond period between pulses) then the receiver is "blanked" 40 percent of the time and there is a 40 percent chance with a given PRF that a target will be partially "blanked" in range. By using a plurality of different PRFs during the high PRFs search mode the probability of a target return being "blanked," i.e. range eclipsed, is reduced.

Figure 3:
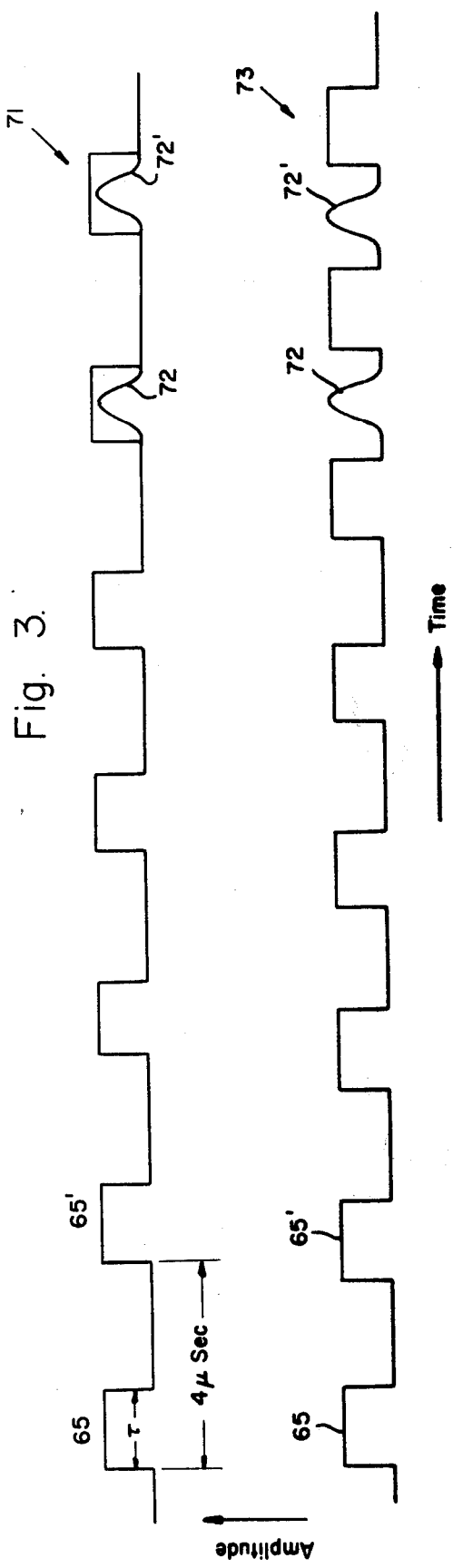
FIG. 3 presents amplitude versus time waveforms which are useful for explaining how the subject invention operates to avoid range eclipsing of target returns.

This just described target range eclipsing problem is illustrated in a waveform 71 of FIG. 3. As there shown, for a PRF of 250,000 pps there is 4 microseconds between leading edges of transmitter pulses and so for pulses of 1.6 microsecond duration ($\tau$) the receiver is blanked 40 percent of the time. For the case depicted in waveform 71, target returns 72 and 72' are obscured due to the fact that they are received during transmission periods in which the receiver is inoperative. Target returns 72, for example, may be the return from transmission pulse 65 and target 72' the return from transmission pulse 65'. For the situation depicted in a waveform 73 the target is still at the same range as before but the PRF has been selected at 275,000 pulses per second and range eclipsing is avoided. Alternately, a target at a different range could be eclipsed by the transmission waveform 73 (FIG. 3) but not by the waveform 71. Hence, during the search mode in which target's range is an unknown factor a plurality of properly selected different PRFs reduce the probability of a target return being blanked.

Again referring primarily to FIG. 2, during an interval 51 data from the transmission of a train of energy pulses of a high PRF waveform during an interval 41 is analyzed within the programmable signal processor 24 and during the interval ending at a time 61 no target is detected for the illustrated example. Similarly, no target is detected during a processing interval ending at a time 62. However, a target having a measured range $\dot{R}$ is detected during the processing interval ending at a time 63. Since a high PRF interval 44 commenced before the target duration, the data therefrom, although not required, is processed during an interval 54. In the meantime, a train of energy pulses of a low PRF waveform is transmitted at an adaptively selected pulse repetition frequency in response to measured $\dot{R}$ such that the doppler frequency of the target is not obscured by clutter energy in the received signal.

Figure 4:
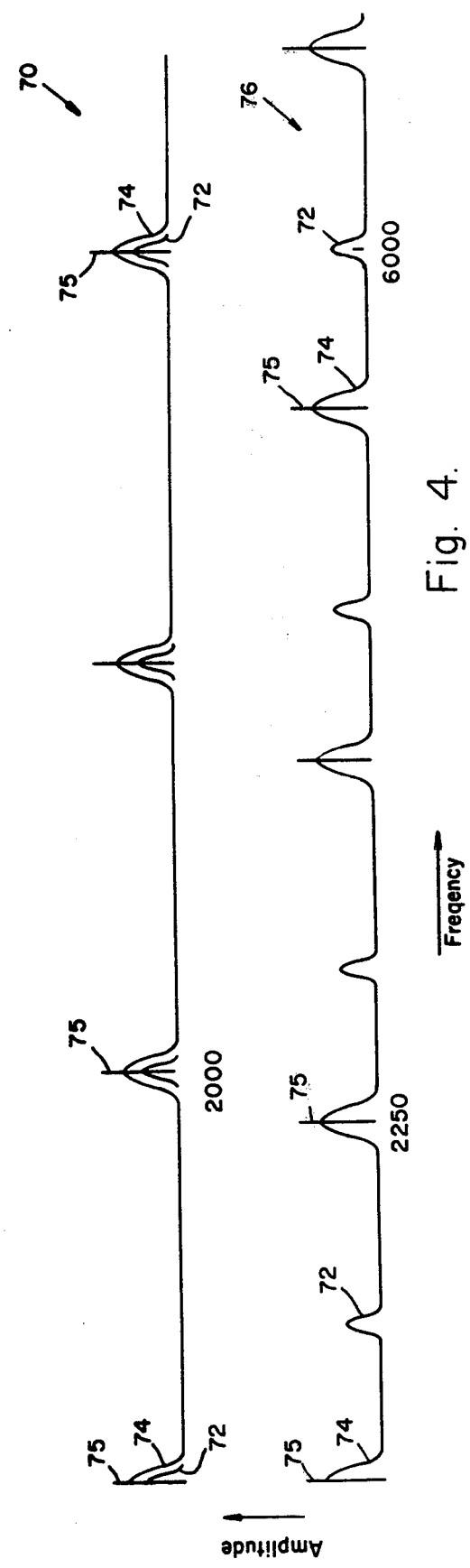
FIG. 4 presents amplitude versus frequency waveforms which are useful for explaining how the subject invention operates to avoid doppler eclipsing of target returns.

On this last point, reference is directed to FIG. 4 wherein a waveform 70 thereof is a frequency versus amplitude waveform (spectrum) for a received signal from a low PRF transmission illustrated as 2,000 pulses per second. In the waveform 70 a target signal 72 having a (true) doppler frequency of 6,000 hz, for example, is shown as well as clutter signals 74, which have a clutter spectral width of 250 hz. As illustrated in the waveform 70, the returns from the target 72 are "buried" in the clutter energy. A waveform 76 shows the same conditions as described for the waveform 70 except the pulse repetition frequency is illustrated at 2,250 pulses per second; and as evident in waveform 76 the target return, still at 6,000 hz, is now positioned between clutter spectral lines so as not to be degraded by the clutter energy.

In FIG. 4, spectral lines 75 are indicative of the spectrum of the LPRF (low PRF) waveform. Due to the motion compensation implementation (discussed hereinabove relative to navigation unit 34) the clutter signals 74 are "centered" on "PRF spectral lines" 75. If motion compensation were not implemented the clutter signals would be displaced from the PRF spectral lines by the doppler frequency shift of the clutter (here assumed to be returns from stationary objects) due to motion of the radar system.

Normally, the processor 24 would be programmed to select a PRF for a given target such that the frequency of the received target energy will be outside of the clutter spectral zone and the transmission of a train of such pulses is depicted by an interval 45 of FIG. 2. An interval 55 of FIG. 2 depicts the processing of the low PRF return signals so as to measure the target's range. In summary, the time interval between the low PRF pulses is adquate to measure unambiguously the target range but the PRF must be "tailored" (selected) so that the (ambiguous) frequency of the target return is sufficiently removed from the frequency of clutter energy so as not to be obscured thereby. Thus in the period between 42 and 46 (FIG. 2) the radar is able to gather data in a clutter environment to umambiguously measure the range and range rate of a previously unknown target.

Again, referring to FIG. 2, at 39 the look angle of the antenna's beam is advanced and the adaptive high PRF (HPRF) is determined as a function of the predicted range of an anticipated target. The predicted range is supplied by the CDC 30 as a function of track file data for the current beam position. The adaptive high PRF is selected to be of such a value as to avoid range eclipsing of target returns.

At a time 66 a range rate ($\dot{R}$) detection is made from returns from the high PRF adaptive waveform and the measured $\dot{R}$ value is used to determine the proper adaptive low PRF waveform for transmission at an interval 47. At an interval 57 the returns from this low PRF transmission are processed and a range detection is made at a time 67.

Reference is now primarily directed to FIGS. 5 through 7 which depict the flow charts for the adaptive waveform portion of the program for the signal processor 24. In a step 100 a check is made if the mode tag "HIGH" is 1. If this tag is high, the system, under the control of the PSP 24, is set at a step 102 to the high PRF mode and radar data received by the processor 24 from the antenna 12 (FIG. 1) is processed in accordance with normal high PRF doppler processing techniques such as those discussed hereinabove. For each detected target the measured target velocity ($R_m$) is supplied to the track file of central data computer 30 wherein it is associated with the target bearing (angular position) data derived from antenna 12 (FIG. 1). Also, the number of target detections is "stored" as the operator "i" in a step 104.

If the number "i" is determined in a step 106 to be zero (no target detections) the program branches to a point 109 for continuation of the high PRF search mode, such as illustrated by intervals 41–44 and 46 of FIG. 2. If the operator "i" is determined in step 106 to be one or greater (one or more detected targets) then a step 108 calls the adaptive low (or medium) PRF selection subroutine of FIG. 6.

Referring now primarily to FIG. 6, the steps there designated by a bracket 112 deal with the situation where more than one doppler filter has an output signal which exceeds the threshold level. The steps of bracket 112 implement logic which chooses the target whose doppler frequency is within ±3,000 hz, in the illustrated example, from the predicted doppler frequency of a target track, supplied from the CDC unit 30, which is approximately at the angular position currently being interrogated by the antenna 12 (FIG. 1). The ±3,000 hz doppler "window" is an arbitrary choice based upon an assumed maximum target maneuver capability in a given period of time. In a step 114 (FIG. 6) the predicted range rate ($\dot{R}_p$) of the target track which correlates with the current spatial position of the antenna 12 is received from the track file of CDC 30 and the predicted target doppler frequency is computed as $TD_p = 2\dot{R}_p/\lambda$ where $\lambda$ is the wavelength of the transmitted energy.

At a step 116 the operator "j" is set to 1 and the doppler frequency $TD_j$ for the first detected target is computed at a step 118 as equal to N × 150 + 75 for opening targets (designated "+") and (127−N) × 150 + 75 for closing targets (designated "−"). In these equations, capital N is the filter number (from step 102 of FIG. 5) in which the target was detected. The number 150 is, by way of example, the frequency separation between filters and the number 75 implement the assumption that the target is halfway between adjacent filters.

In a step 120 $\delta$ is computed as the difference between the measured doppler frequency $TD_j$ and the predicted doppler frequency ($TD_p$) computed in the step 114. In a step 122 a determination is made as to whether the absolute magnitude of $\delta$ is less than 3,000 hz. If this determination is affirmative, then the value of the target doppler (TD) in block 124 is set to the computed value $TD_j$ and the subroutine proceeds to compute the adaptive low PRF, i.e. the subroutine proceeds to a step 130.

If the absolute value of $\delta$ is not less than 3,000 hz the operator "j" is incremented by one in a step 126. At a step 128 a check is made if the operator "j" is greater than the operator "i;" where "i" is indicative of the number of targets detected, i.e. the number of filters excited, at a given dwell location. If "j" is greater than "i" then the subroutine branches through a point 123 to a step 124, and if "j" is not greater than "i" the just described sequence is repeated for the next detected target except that in the step 116 "j" is set equal to its value from step 126.

If, for example, there were two targets detected and if the predicted doppler value ($TD_p$) was not within 3,000 hz of the doppler value of either target, after the second processing sequence the value of "j" would exceed the value of "i" and at step 128 the subroutine would branch to the step 124. Similarly, if one one target were present, after one sequence of operation, step 128 would branch to the step 124. If there were no targets in the track file which corresponds to the location of the detected targets then the value of the predicted range rate ($\dot{R}_p$) would be entered as zero and the loop 112 would operate as described with the result that the step 128 would branch the operation to step 124. For all cases described, the value of TD would be set equal to the last doppler ($TD_j$) which was computed in the step 118.

If there is more than one target in the track file of CDC 30 which correlates with the current position of antenna 12 (FIG. 1), the values of ($\dot{R}_p$) therefore are sequentially used in step 114 in the same manner as described herein for multiple detected targets (the steps of bracket 112). In the interest of maintaining the clarity of the drawings, the multiple track file correlation case is not illustrated in the figures.

The just described method of processing multiple target detections is presented by way of example and it is noted that many suitable multiple target processing routines could be utilized in accordance with the principles of the subject invention. As examples, instead of the steps of bracket 112 (FIG. 6) each target detection (i) could be used to compute an associated low PRF which would be transmitted and its returns would be processed; or all target detections (i) could be used to compute an associated single low PRF which provides a clutter free doppler region for the maximum number of targets.

For expected target range rates, a step 130 of FIG. 7 determines if the target doppler frequency (TD) is between two preselected values, which for example are shown as 6675 and 7425 hz. If the determination is answered in the affirmative, then the value of the low PRF is selected from a lookup table 132; with the PRF selected being that associated with the doppler table value which is closest to the doppler frequency (TD) of the detected target.

If the determination of step 130 is negative then the low PRF is selected by means of steps 134 through 137. At the step 134 operator "k" is set to one and the low PRF is set to a value equal to $TD/(k+1/2)$. At the step 136 a determination is made if the just computed value of the low PRF is less than 4,400 pps (which provides a minimum unambiguous range of approximately 17 miles), if it is then that low PRF value is selected. If the computed low PRF is not less than 4,400 pps, then the computation of step 135 is repeated with operator "k" being incremented by one. The subroutine 108 (FIG. 6) exits to step 110 of FIG. 5, wherein the "HIGH" mode tag is set to zero.

In the subject embodiment the pulse width ($\tau$) (see FIG. 3) is preselected for both the high and low PRF modes, respectively. Similarly the duration of the pulse trains (T) (see FIG. 2) is preselected for both the high and low PRF modes, respectively.

Continuing now with the description of the program of FIG. 5, the path resulting from a "yes" response (high PRF mode) at the step 100 has been described and the case for a zero "HIGH" mode tag will now be considered. In a step 150 programmable signal processor 24 is set to process low PRF data, i.e. targets are detected and data definitive of target range (unambiguous) and target range rate (ambiguous) is supplied to the track file of central data computer 30 (FIG. 1). A step 151 causes the antenna's beam pattern to advance to the next dwell position; and a step 152 determines if a target in the central data computer (FIG. 1) track file spatially correlates with the current antenna position. This operational step 152 is accomplished by comparing the current measured antenna angular positions ($Az_m$ and $El_m$) with the predicted positions ($Az_p$ and $El_p$) of target tracks from the track file of CDC 30 (FIG. 1). Upon the establishment of such a correlation condition the program exits to the subroutine of a step 154 (FIG. 7) for adaptively selecting the high PRF waveform. If the spatial correlation check of step 152 is negative, then the program of FIG. 5 goes to a step 156 wherein a preselected group of high PRF waveforms are implemented (see intervals 41 through 43 of FIG. 2). Upon selection of the high PRF waveform by either the adaptive subroutine of step 154 or the "open loop" implementation of step 156, the PRF mode tag "HIGH" is set to one in steps 158 or 160 and the program cycles to point A.

The subroutine of step 154 which is shown in further detail in FIG. 7, computes an adaptive high PRF as a function of range ($R_p$) predicted from track file data from prior antenna scan cycles of the current dwell position. The adaptive high PRF is selected so that target returns will not be eclipsed due to the inoperability of the receiver during transmission periods. As shown in FIG. 7, the operator "MIN" is set to 0.9999 in a step 164. In a step 166 the operator "q" is set to 1 and in a step 168 an operator "X" is set equal to the absolute value of the fractional part of the equation ($2R_{p/c}$ · $PRF$)−0.5. In this just set forth equation, $R_p$ is equal to the range for a target track predicted by CDC 30 to be contiguous with the current antenna "look angle." $R_p$ is computed by CDC 30 as a function of measured range ($R_m$), range rate ($\dot{R}_m$) and bearing in accordance with well known target tracking techniques. The parameter c is equal to the speed of light as used for computing range, i.e. 983.59 feet per microsecond. The parameter $PRF_q$ is indicative of one PRF from a library of PRFs and in the embodiment depicted in FIG. 7 the library has 6 preselected PRFs. The values of the PRFs in the library are chosen to maximize the likelihood that no target will be eclipsed on all of the PRFs in the library; and of course a library of any suitable size may be implemented.

The subroutine of FIG. 7, selects the PRF for which the target is most nearly centered between transmitted pulses (see FIG. 3). For example, if the operator "X" turns out to be zero then for the associated PRF the predicted range of the target is centered between transmitted pulses. At a step 170, the determination is made as to whether the computed value "X" is less than the operator "MIN." If this determination is positive then the operator "j" is set equal to "q" at a step 172 and the operator "MIN" is set equal to the last computed value of "X."

At a step 174, a determination is made as to whether or not the indicator "q" had been sequenced up to the maximum number of PRFs in the library, i.e. 6. At a step 176 the operator "q" is incremented by one and the computation of step 168 is repeated with the second PRF from the library, i.e. $PRF_2$. Following this computation the above described sequence of operations is repeated until all PRFs in the library have been checked, i.e. until "q" is equal to 6 for the present example. Upon a yes determination of step 174 the high PRF (HPRF) is set to $PRF_j$, i.e. to that $PRF_q$ which during computation step 168 produce the minimum fractional part. Following the step 178, subroutine 154 of FIG. 7 exits to the step 160 of FIG. 5.

Figure 8:
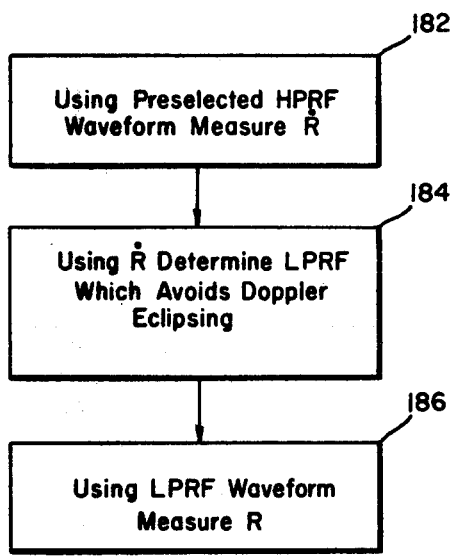
FIG. 8 is a flow chart of the steps of a method which uses high and low PRF waveforms for adaptively measuring target range in accordance with the subject invention.

The steps for unambiguously measuring target range and range rate for the case of no predicted range data ($R_p$) from the track file of CDC 30 (FIG. 1) are illustrated in FIG. 8 to which reference is now directed. In a step 182 of FIG. 8, preselected multiple high PRFs waveforms are used to measure range rate, as described relative to intervals 41–44 and 51–54 of FIG. 2 and steps 102 and 156 of FIG. 5. In a step 184 the measured range rate ($\dot{R}$) from the step 182 is used to compute a low PRF which will produce target return signals at preselected relative frequency zones within the spectrum of the low PRF signal (see FIG. 4, step 108 of FIG. 5 and the subroutine of FIG. 6). The particular subroutine of FIG. 6 determines a low PRF waveform which causes the frequencies of target return signals to be approximately in between the frequencies of the spectral lines of the low PRF waveform; whereby the probability of doppler eclipsing of energy returns from the target is reduced. In a step 186 the computed low PRF waveform is used to unambiguously measure the target's range (see intervals 45 and 55 of FIG. 2 and step 150 of FIG. 5).

Figure 9:
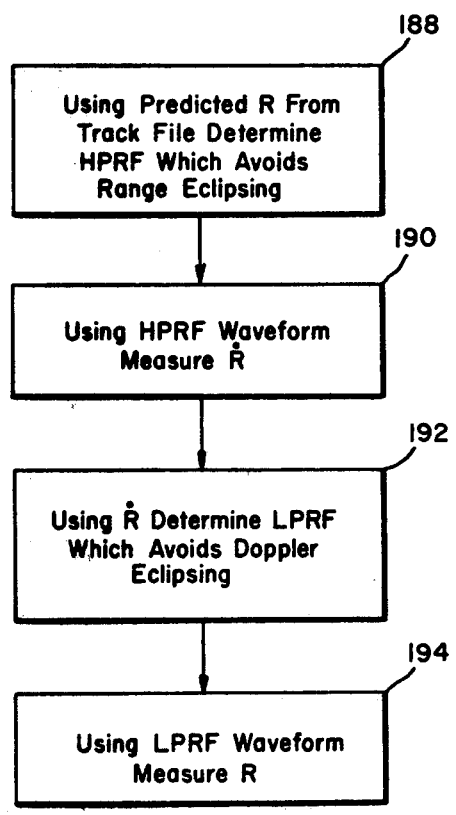
FIG. 9 is a flow chart of the steps for a method which uses high and low PRF waveforms for adaptively measuring target range and range rate in accordance with the subject invention.

The case where track file data from CDC 30 (FIG. 1) provides the predicted range ($R_p$) of a target forecasted at the current dwell position (position of antenna's beam) is illustrated in FIG. 9 to which reference is now directed. In a step 188 the predicted range ($R_p$) from the track file is used to compute the high PRF which avoids range eclipsing, as explained relative to FIG. 3, step 154 of FIG. 5 and the subroutine of FIG. 7. The particular subroutine of FIG. 7 determines a high PRF waveform which will cause the energy returned from the target to be approximately centered between transmitted energy pulses.

In a step 190 the high PRF computed in the step 188 is used to measure range rate ($\dot{R}$) (see intervals 46 and 56 in FIG. 2); and in a step 192 the measured range rate is used to compute a low PRF which avoids doppler eclipsing of the target (see FIG. 4, step 108 of FIG. 5 and the subroutine of FIG. 6). In a step 194 the computed low PRF is used to unambiguously measure the target's range (R) (see intervals 47 and 57 of FIG. 2 and step 150 of FIG. 5).

The term high PRF (HPRF) as used herein includes that range of PRF values which provides unambiguous range rate data from returns from the transmission of a train of pulses at a single such PRF; e.g. PRFs which are greater than 50,000 pulses per second.

The term low PRF (LPRF) as used herein includes that range of PRF values which provides unambiguous range data from returns from the transmission of a train of pulses at a single such PRF; e.g. PRFs which are less than 10,000 pulses per second.

The term medium PRF (MPRF) as used herein is defined as that range of PRF values which provides radar data that can be processed to provide unambiguous range and if desired range rate data from returns from the sequential transmission of trains of pulses at a plurality of such PRFs, e.g. PRFs which are between 10,000 and 50,000 pulses per second.

It is noted that the ranges of values for the high, low and medium PRFs are dependent upon the target range and range rate anticipated for a given application.

The term "lower" PRF as used herein is defined as including the above described low and medium PRF ranges.

Although the subject invention has been herein described primarily in terms of high and low PRF waveforms it will be apparent to those skilled in the art that the subject invention may be used to accurately, and unambiguously measure target range and range rate using high and medium PRF (MPRF) waveforms. For example, it is well known in the art how a plurality of trains of energy pulses of different MPRF waveforms may be sequentially transmitted and their return signals processed to provide unambiguous target range data. To incorporate the subject invention into an HPRF - MPRF system would only require, for example, deleting blocks 130 and 134–137 of FIG. 6 and providing lookup table 132 with the appropriate data for sets of MPRF waveforms. For example, lookup table 132 for the MPRF implementation would provide two or more MPRF values for each TD value and the trains of energy pulses of the MPRF waveforms would be sequentially transmitted during each of the intervals labeled LPRF in FIG. 2, i.e. intervals 45 and 47. The values of MPRF in the lookup table 132 would be precomputed so that doppler eclipsing of target returns is avoided.

Alternately, the medium PRF implementation could follow the same format outlined in the subroutine of FIG. 6 except the PRF values would be modified to those in the medium PRF range. In such an implementation only one MPRF value would be adaptively selected and to resolve the range ambiguity the system would use a plurality of waveforms which are slightly offset in pulse repetition rate from the adaptive value.

Figure 10:
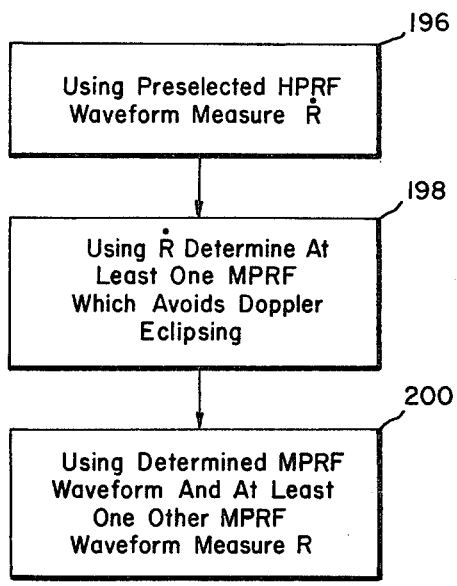
FIG. 10 is a flow chart of the steps of a method which uses high and medium PRF waveforms for adaptively measuring target range in accordance with the subject invention.

The steps for measuring target range and range rate in an HPRF - MPRF implementation are illustrated in FIG. 10 to which reference is now directed. In a step 196 of FIG. 10, preselected multiple high PRF waveforms are used to measure range rate ($\dot{R}$). In a step 198 the measured range rate from the step 196 is used to determine at least one MPRF which avoids doppler eclipsing; and in a step 200 the MPRF determined in step 198 and at least one other MPRF waveform are used to measure the target's range (R).

Figure 11:
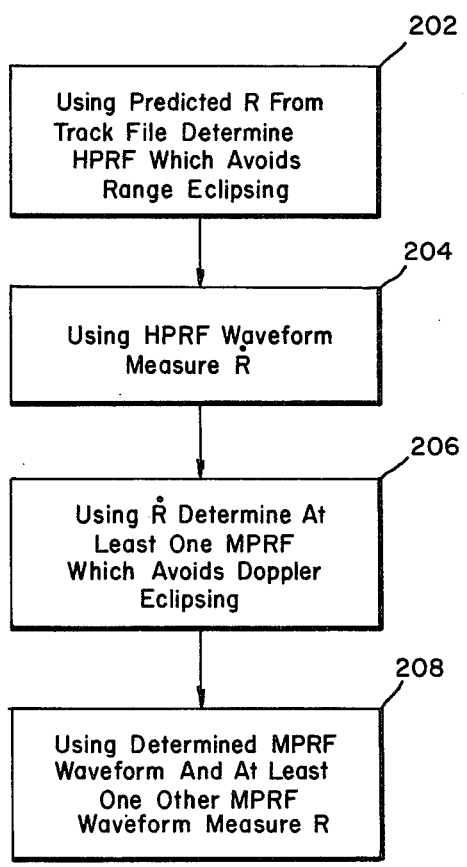
FIG. 11 is a flow chart of the steps for a method which uses high and medium PRF waveforms for adaptively measuring target range and range rate in accordance with the subject invention.

The HPRF - MPRF implementation for the situation where track file data from CDC 30 (FIG. 1) provides the predicted range ($R_p$) of a target forecasted at the current dwell position (position of antenna's beam) is illustrated in FIG. 11. In a step 202 the predicted range ($R_p$) from the track file is used to compute the high PRF which avoids range eclipsing. The HPRF computed in the step 202 is used in a step 204 to measure range rate ($\dot{R}$); and in a step 206 the measured range rate from the step 204 is used to determine at least one MPRF which avoids doppler eclipsing. In a step 208 to MPRF determined in step 206 and at least one other MPRF waveform are used to measure the target's range (R).

The term clutter as used herein includes unwanted received signals such as those caused by returns from the ground, the sea, rain, stationary objects and chaff.

One additional advantage of the subject invention is that due to its ability to adaptively "position" the target signals in the spectrum of the received energy, it may not be necessary, for certain applications, to implement clutter motion compensation (discussed hereinabove relative to navigation unit 34 of FIG. 1). For example, if the radar system is carried by land or sea transport means, for some applications the target returns, when adaptively "positioned" between PRF spectral lines, will be free from clutter energy even if the clutter zone is "spread" due to non-compensated motion of the radar system.

Thus having described a new and useful adaptive radar system and the manner and process of making and using it, what is claimed is:

1. The method of measuring the range and range rate of a target, comprising the steps of:
    (1) transmitting a train of energy pulses of at least one preselected high PRF waveform which has a sufficiently high PRF value as to produce unambiguous range rate data for said target from a train of pulses of a single such high PRF, and measuring the range rate of the target from energy returned therefrom;
    (2) determining, as a function of said range rate measured in step (1) a low PRF waveform which has a sufficiently low PRF value as to produce unambiguous range data for said target from a train of pulses of a single such low PRF, and which will produce target return signals at preselected relative frequency zones within the spectrum of said low PRF waveform; and
    (3) transmitting a train of energy pulses of the low PRF waveform determined in step (2) and measuring the range of the target from energy returned therefrom.

2. The method of claim 1 wherein step (1) thereof includes sequentially transmitting a plurality of preselected high PRF waveforms; whereby the probability of range eclipsing of said energy returned from the target is reduced.

3. The method of claim 1 wherein step (2) thereof includes determining as a function of said measured range rate a low PRF waveform which causes the frequencies of return target signals to be approximately inbetween the frequencies of the spectral lines of the low PRF waveform; whereby the probability of doppler eclipsing of energy returns from the target is reduced.

4. The method of measuring the range and range rate of a target in response to a supplied predicted range value for the target, said method comprising the steps of:
    (1) determining as a function of the supplied predicted range value a high PRF waveform which has a sufficiently high PRF value as to produce unambiguous range rate data for said target from a train of pulses of a single such high PRF, and which will avoid range eclipsing;

(2) transmitting a train of energy pulses of the high PRF waveform determined in step (1) and measuring the range rate of the target from energy returned therefrom;

(3) determining, as a function of said range rate measured in step (2), a low PRF waveform which has a sufficiently low PRF value as to produce unambiguous range data for said target from a train of pulses of a single such low PRF, and which will produce target return signals at preselected relative frequency zones within the spectrum of said low PRF waveform; and (4) transmitting a train of energy pulses of the low PRF waveform determined in step (3) and measuring the range of the target from energy returned therefrom.

5. The method of claim 4 wherein step (3) thereof includes determining as a function of said measured range rate a low PRF waveform which causes the frequencies of return target signals to be approximately inbetween the frequencies of the spectral lines of the low PRF waveform; whereby the probability of doppler eclipsing of energy returns from the target is reduced.

6. The method of claim 4 wherein step (1) thereof includes determining as a function of the supplied predicted range value a high PRF waveform which will cause the energy returned from the target in step (2) to be approximately centered between transmitted energy pulses.

7. The method of measuring the range and range rate of a target, comprising the steps of:

(1) transmitting a train of energy pulses of at least one preselected high PRF waveform which has a sufficiently high PRF value as to produce unambiguous range rate data for said target from a train of pulses of a single such high PRF, and measuring the range rate of the target from energy returned therefrom;

(2) determining, as a function of said range rate measured in step (1) at least two medium PRF waveforms which are of such PRF values as to produce unambiguous range data for said target from the sequential transmission of trains of pulses of each of said two medium PRF waveforms and which will produce target return signals at preselected relative frequency zones within the spectrum of said at least two medium PRF waveforms; and (3) sequentially transmitting a train of energy pulses of each of said at least two medium PRF waveforms determined in step (2), and measuring the range of the target from energy returned from the transmission of said medium PRF waveforms.

8. The method of measuring the range and range rate of a target in response to a supplied predicted range value for the target, said method comprising the steps of:

(1) determining as a function of the supplied predicted range value a high PRF waveform which has a sufficiently high PRF value as to produce unambiguous range rate data for said target from a train of pulses of a single such high PRF, and which will avoid range eclipsing:

(2) transmitting a train of energy pulses of said high PRF waveform determined in step (1) and measuring the range rate of the target from energy returned therefrom;

(3) determining, as a function of said range rate measured in step (2) at least two medium PRF waveforms which are of such PRF values as to produce unambiguous range data for said target from the sequential transmission of trains of pulses of each of said two medium PRF waveforms and which will produce target return signals at preselected relative frequency zones within the spectrum of said at least two medium PRF waveforms; and (4) sequentially transmitting a train of energy pulses of each of said at least two medium PRF waveforms determined in step (3), and measuring the range of the target from energy returned from the transmission of said medium PRF waveforms.

9. The method of claim 8 wherein step (3) thereof includes determining, as a function of said measured range rate, said at least one medium PRF waveform such that the frequencies of return target signals will be approximately inbetween the frequencies of the spectral lines of said at least one medium PRF waveform; whereby the probability of doppler eclipsing of energy returns from the target is reduced.

10. The method of claim 8 wherein step (1) thereof includes determining as a function of the supplied predicted range value a high PRF waveform which will cause the energy returned from the target in step (2) to be approximately centered between transmitted energy pulses.

* * * * *